(12) United States Patent
Yue

(10) Patent No.: US 7,318,618 B1
(45) Date of Patent: Jan. 15, 2008

(54) REINFORCED TONNEAU COVER

(75) Inventor: Shiawdar Yue, Cupertino, CA (US)

(73) Assignee: CYC Engineering, Fremont, CA (US)

(*) Notice: Subject to any disclaimer, the term of this patent is extended or adjusted under 35 U.S.C. 154(b) by 36 days.

(21) Appl. No.: 11/450,779

(22) Filed: Jun. 9, 2006

(51) Int. Cl.
 *B60P 7/02* (2006.01)
(52) U.S. Cl. ............................. 296/100.06; 296/100.02
(58) Field of Classification Search .......... 296/100.06, 296/100.02, 100.1
 See application file for complete search history.

(56) References Cited

U.S. PATENT DOCUMENTS

| | | |
|---|---|---|
| 1,209,265 A | 12/1916 | Crowell |
| 1,294,708 A | 2/1919 | Rochlis |
| 2,090,815 A | 8/1937 | Simmons, Jr. |
| 2,964,439 A | 12/1960 | Picking, Jr. et al. |
| D190,418 S | 5/1961 | Havens |
| 3,489,456 A | 1/1970 | Klanke |
| 3,546,841 A | 12/1970 | Smith et al. |
| 3,568,390 A | 3/1971 | Swensen et al. |
| D224,704 S | 9/1972 | Hill et al. |
| 3,696,578 A * | 10/1972 | Swensen et al. ........... 52/789.1 |
| 3,785,698 A | 1/1974 | Dean et al. |
| 3,796,168 A * | 3/1974 | Zeller .................... 286/100.06 |
| 4,079,989 A | 3/1978 | Robertson |
| 4,546,994 A | 10/1985 | Taylor |
| 4,657,274 A | 4/1987 | Mann et al. |
| 4,748,789 A * | 6/1988 | Hedley ....................... 52/789.1 |
| 4,762,360 A | 8/1988 | Huber |
| 4,778,709 A | 10/1988 | Abe et al. |
| 4,789,197 A | 12/1988 | Lewis |
| 4,824,162 A | 4/1989 | Geisler et al. |
| 4,844,531 A | 7/1989 | Kooiker |
| 4,889,758 A * | 12/1989 | Rinkewich ................... 428/178 |
| D310,987 S | 10/1990 | Law et al. |
| 5,016,898 A | 5/1991 | Works et al. |
| 5,067,766 A | 11/1991 | Lovaas |
| 5,115,878 A * | 5/1992 | Hayata ................... 296/187.09 |
| 5,190,341 A | 3/1993 | Simard |
| D335,850 S | 5/1993 | Cyrson |
| D343,602 S | 1/1994 | Brown |
| D365,030 S | 12/1995 | Loughlin |
| 5,652,039 A | 7/1997 | Tremain et al. |
| 5,743,586 A | 4/1998 | Nett |
| D403,292 S | 12/1998 | Bogard |

(Continued)

FOREIGN PATENT DOCUMENTS

GB 1 303 492 1/1973

(Continued)

OTHER PUBLICATIONS

A.R.E. Product Catalog, recieved Feb. 3, 1997.

(Continued)

*Primary Examiner*—Kiran B. Patel
(74) *Attorney, Agent, or Firm*—Knobbe Martens Olson & Bear LLP

(57) ABSTRACT

A tonneau cover for use on a vehicle bed can have a multilayer construction. The multilayer tonneau cover can include an upper layer and a reinforcing layer. The tonneau cover can also have a lower layer. The reinforcing layer can include a reinforcing beam to reduce the potential for cracking of the upper layer. The reinforcing beam can be elongate and non-intersecting along its path.

23 Claims, 5 Drawing Sheets

U.S. PATENT DOCUMENTS

| | | | |
|---|---|---|---|
| 5,857,729 A * | 1/1999 | Bogard | 296/100.02 |
| D421,736 S * | 3/2000 | Bogard | D12/401 |
| 6,042,173 A | 3/2000 | Nett | |
| 6,082,601 A | 7/2000 | Prince et al. | |
| 6,227,602 B1 * | 5/2001 | Bogard | 296/100.06 |
| D444,762 S * | 7/2001 | Werle et al. | D12/401 |
| 6,331,028 B1 | 12/2001 | O'Neill et al. | |
| 6,340,194 B1 * | 1/2002 | Muirhead et al. | 296/100.06 |
| 6,431,633 B1 * | 8/2002 | Young et al. | 296/100.06 |
| 6,447,000 B1 | 9/2002 | Dick et al. | |
| 6,533,343 B2 | 3/2003 | Bohm et al. | |
| 6,533,344 B1 | 3/2003 | Patterson | |
| 6,588,826 B1 * | 7/2003 | Muirhead | 296/100.06 |
| 6,712,418 B1 | 3/2004 | Lathers | |
| 6,857,683 B2 * | 2/2005 | Myers | 296/100.02 |

FOREIGN PATENT DOCUMENTS

| | | |
|---|---|---|
| JP | 60-219168 | 11/1985 |

OTHER PUBLICATIONS

Photographs dated Apr. 19, 2000 (Sportsman Pickup Covers and Image Accessories).

Urban Industries, Inc. Slim Top Installation Instructions, dated Jun. 17, 2002.

Fastback-II Flush Mounted Tonneau Cover installation & Removal Instructions, dated Apr. 7, 1998.

Undercover Tonneau Installation Guide, modified Apr. 2005.

* cited by examiner

REINFORCED TONNEAU COVER

BACKGROUND OF THE INVENTIONS

1. Field of the Inventions

This application relates generally to covers for vehicle beds and more specifically to pick up truck bed covers.

2. Description of the Related Art

Covers for vehicles having open beds such as pick up trucks are referred to as "tonneau" covers. In some configurations of tonneau covers, a single sheet cover is pivotally hinged to a front wall of the pick up truck bed. To assist with opening the cover and maintaining an open position, struts can couple the tonneau cover to side walls of the pick up truck bed. These tonneau covers shelter cargo stored in the vehicle bed from the elements, but are often prone to cracking, crazing, or other damage when used on a vehicle. Typically the tonneau covers are supported only about their peripheries by the front wall, side walls, and tailgate of the vehicle bed, and unsupported in their central area. Thus, once set in motion by road vibrations and bumps encountered by a moving vehicle, the large unsupported span of tonneau cover can exhibit the oscillatory behavior of a drum head. These repeated oscillatory cycles can lead to damage to the tonneau cover.

Various attempts have been made to strengthen or stiffen pick up bed tonneau covers. For example, attempts have been made to integrate a sheet-based tonneau cover with a truss-like structure consisting of a plurality of intersecting beams. While these additions to the tonneau covers can provide a stiffened structure, they can produce other problems such as concentrations of structural weaknesses at certain points and/or increased weight. Increased weight can necessitate increased effort to open the tonneau cover and, in turn, can require higher compression gas shock absorbers or higher strength struts. Additionally, increased weight can make installation and removal of the tonneau cover exceedingly time consuming and cumbersome. Moreover, even with the incorporation of truss-like structures to a tonneau cover, the tonneau covers are often still prone to cracking at points of stress concentration overlying the reinforcing beams.

SUMMARY OF THE INVENTIONS

Tonneau covers having a multi layered construction can overcome the shortcomings of prior covers. More specifically, in some embodiments, the tonneau covers described herein can have a multi-layered construction configured to reduce the incidence of cracking or damage to the tonneau cover. Moreover, the layered construction of the tonneau cover can achieve reductions in cracking tendencies without substantial increases in the weight of the tonneau cover. Thus, the tonneau cover can be easily installed and removed and can have increased longevity compared with other tonneau covers.

In some embodiments, a cover for a vehicle bed is provided. The cover comprises a rigid upper layer and a reinforcing layer. The rigid upper layer is configured to overlie at least a portion of the vehicle bed. The reinforcing layer is disposed under the upper layer. The reinforcing layer has a length and a width. The reinforcing layer includes one or more reinforcing beams to reduce stress concentrations on the upper layer. The reinforcing beam can have a length that is greater than a sum of the length and the width of the reinforcing layer. The reinforcing beam can be structured as a continuous beam that does not intersect with itself.

In other embodiments, a reinforcing layer for a tonneau cover is provided. The reinforcing layer is configured to be disposed under the tonneau cover. The reinforcing layer has a length and a width. The reinforcing layer includes a reinforcing beam to reduce stress concentrations on the tonneau cover. The reinforcing beam can have a length that is greater than a sum of the length and the width of the reinforcing layer. The reinforcing beam can be structured as a continuous beam that does not intersect with itself.

DETAILED DESCRIPTION OF THE PREFERRED EMBODIMENTS

Turning now to the drawings provided herein, a more detailed description of certain embodiments of the present inventions is provided below. It should be noted, however, that while some embodiments have all of the advantages identified herein, other embodiments may only realize some but not all of the advantages.

Figure 1:
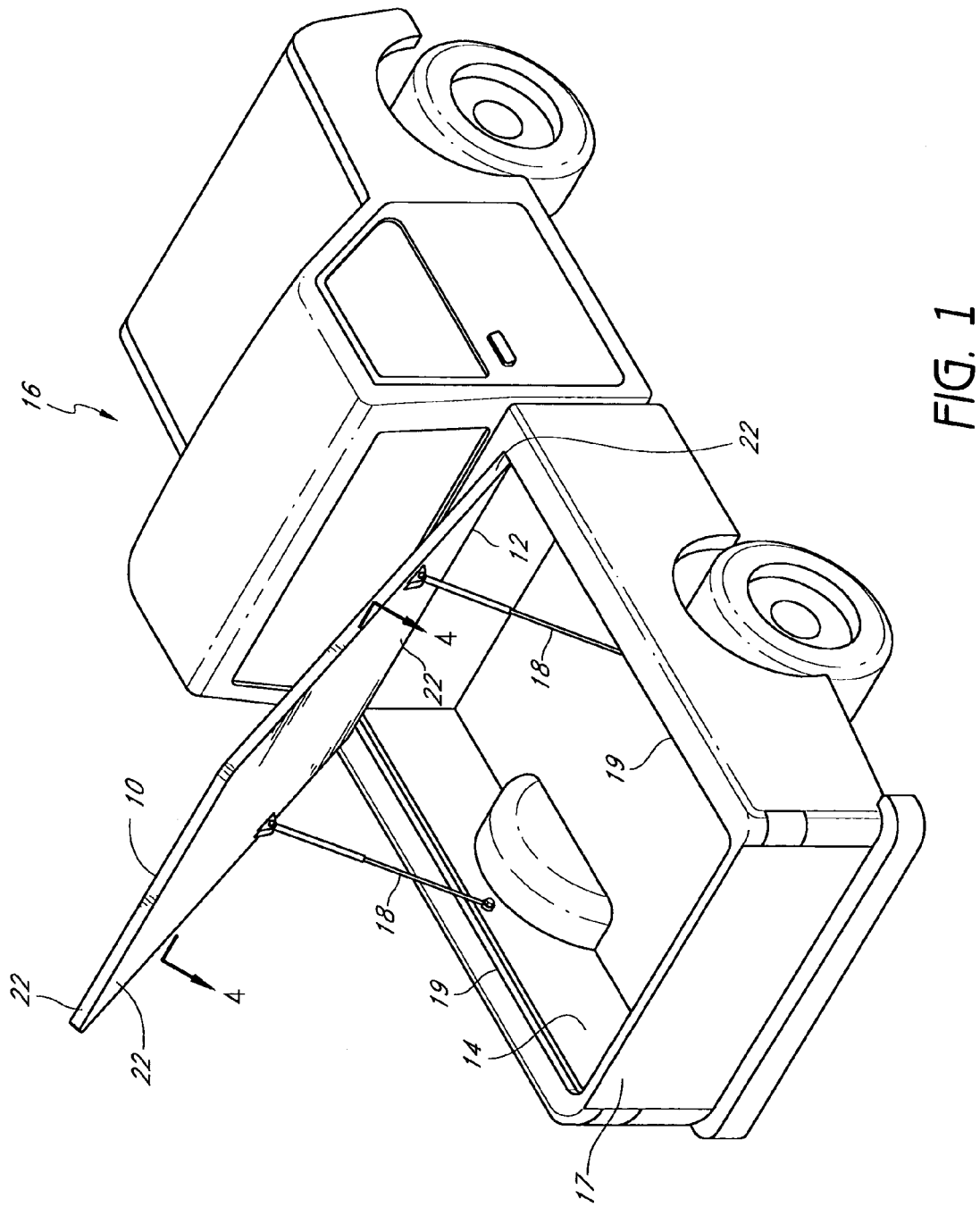
FIG. 1 is a perspective view of an embodiment of a tonneau cover as applied to a pick up truck.

With reference to FIG. 1, a perspective view of an embodiment of a tonneau cover 10 as applied to a bed 14 of a pick up truck 16 is illustrated. As illustrated, the tonneau cover 10 is hingedly mounted to a front edge 12 of the pick up truck bed 14. In the illustrated embodiments, access to the bed 14 is provided by raising the tonneau cover 10 from a rear edge or tailgate 17 of the pick up truck bed 14. In other embodiments, the tonneau cover 10 can be hingedly mounted to the pick up truck bed 16 at a different edge, for example, a left or right sidewall 19 of the bed, thus allowing the tonneau cover 10 to be opened by lifting from a different direction. One or more supports 18 such as gas tube shock absorbers, positionable struts, or telescoping struts can be attached to the sidewalls 19 and can be used to maintain the tonneau cover 10 in a raised position for access to the pick up truck bed 14. While the tonneau cover 10 is illustrated herein as a single piece generally rectangular cover, in other embodiments, the tonneau cover 10 can have multiple hinged or sliding segments to allow for rapid access to a portion of the pick up truck bed 14.

As illustrated in FIG. 1, the tonneau cover 10 is sized and configured to completely cover the pick up truck bed 14 when in a closed position such that water, dirt, and other contaminants are kept out of the pick up truck bed. In some embodiments, the tonneau cover 10 can include a seal configured to sealingly engage sidewalls 19, a front edge 12, and tailgate 17 of the pick up truck bed 14. The tonneau cover 10 can include a latch mechanism configured to engage the tailgate 17 of the pick up truck bed 14 to retain the tonneau cover 10 in a closed position for secure storage of items contained in the pick up truck bed 14 and to prevent unintended opening of the tonneau cover 10 when the pick up truck is in motion. In other embodiments, the tonneau cover 10 can cover only a portion of the bed 14 to allow access to cargo in the bed 14, or allow for storage of items that would not otherwise fit within the covered bed.

Figure 2:
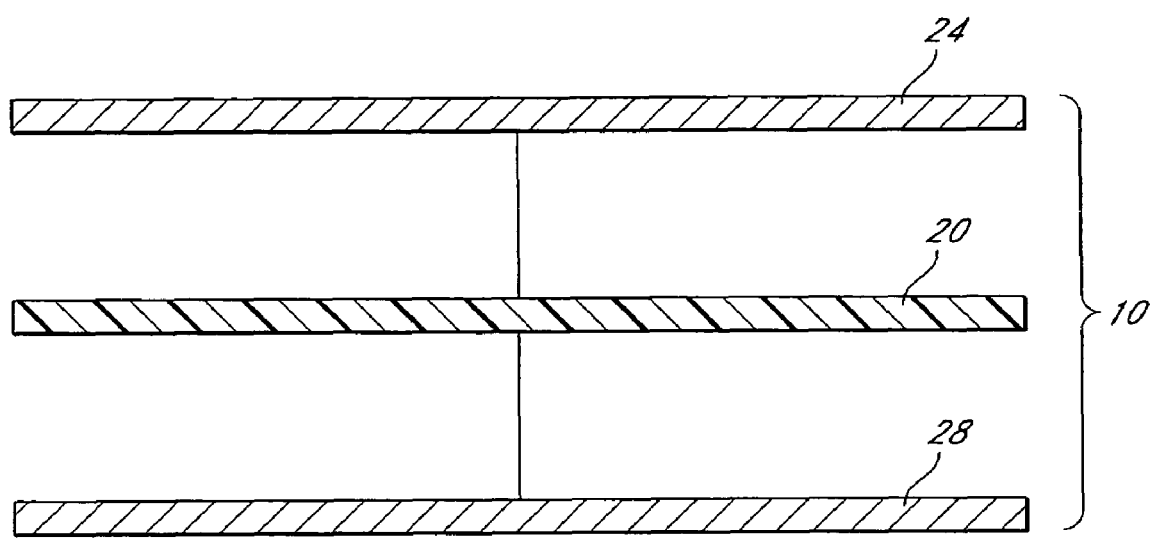
FIG. 2 is a schematic diagram illustrating an exploded view of a multi-layer tonneau cover.

FIG. 2 illustrates a schematic diagram of an exploded view of a tonneau cover 10 having a multilayer construction. The tonneau covers disclosed herein can also be made of single layer construction. In the embodiment of FIG. 2, the tonneau cover 10 can comprise an upper layer 24, a reinforcing layer 20, and a lower layer 28. Thus, as illustrated, the reinforcing layer 20 has a three-layer construction. In other embodiments, the tonneau cover 10 can have a two-layer construction including only a rigid upper layer 24 and a reinforcing layer 20.

As illustrated, the upper layer 24 is generally formed of a single generally rectangular sheet and sized to overlie the bed 14 of a pick up truck 16 (FIG. 1). The upper layer 24 is generally planar but can have transversely extending edges 22 at its front, rear, and side edges to allow the tonneau 10 cover to fit flushly with the pick up truck bed 14 when in a closed position. In some embodiments, the upper layer 24 is rigid. As noted above, in other embodiments, the upper layer 24 can be sized to overlie only a portion of the bed and can be formed of multiple segments that are hingedly or slidingly connected to provide access to the bed 14. The upper layer 24 can be formed of many different types of materials, such as a thermoplastic material (e.g., ABS or PVC plastic), a urethane, or a composite material such as fiberglass. Desirably, the rigid upper layer 24 can be pigmented, dyed, or painted to match the paint color and paint characteristics (e.g., metal or mica flake content and pearlescence) of a vehicle to which the tonneau cover 10 is applied.

As illustrated in FIG. 2, the tonneau cover 10 can also comprise a reinforcing layer 20. As further discussed below with respect to FIGS. 3A, 3B, and 4, the reinforcing layer 20 generally supports the upper layer 24. In some embodiments, the reinforcing layer does not add significant weight to the tonneau cover 10. In various embodiments, several of which are discussed below with respect to FIGS. 3A and 3B, the reinforcing layer 20 can reduce localized stress concentrations on the upper layer 24, and can thus reduce damage to the tonneau cover 10 and can prolong the useful life of the tonneau cover. In other embodiments, the reinforcing layer 20 can comprise a foam material injected between the upper layer 24 and the lower layer 28. The foam can be structural foam (e.g. polyurethane foam) to provide a reinforcing effect. The foam can be configured as a beam following a generally spiral path as discussed below with reference to FIGS. 3A and 3B.

In embodiments having a three layer construction, as illustrated in FIG. 2, a lower layer 28 can be affixed or bonded to the reinforcing layer 20, the upper layer 24, or both using one of the techniques described further below with respect to FIG. 4. On some two-layer embodiments, the lower layer 28 is omitted. While the upper layer 24 desirably presents a smooth upper surface that can be painted or dyed to match the color of a vehicle (or, in some applications, to complement a vehicle's color in a multi-tome color scheme), in certain embodiments, the lower layer 28 is not painted or dyed. Moreover, in some embodiments, the lower layer 28 does not receive a surface treatment and can have a roughened texture as is present in unsmoothed glass fiber composite materials or carbon fiber composite materials. In other embodiments, the lower layer 28 can present a smoothed surface that can be painted or dyed to match the color of a vehicle or to coordinate with a desired multi-color scheme for a vehicle.

Figure 3A:
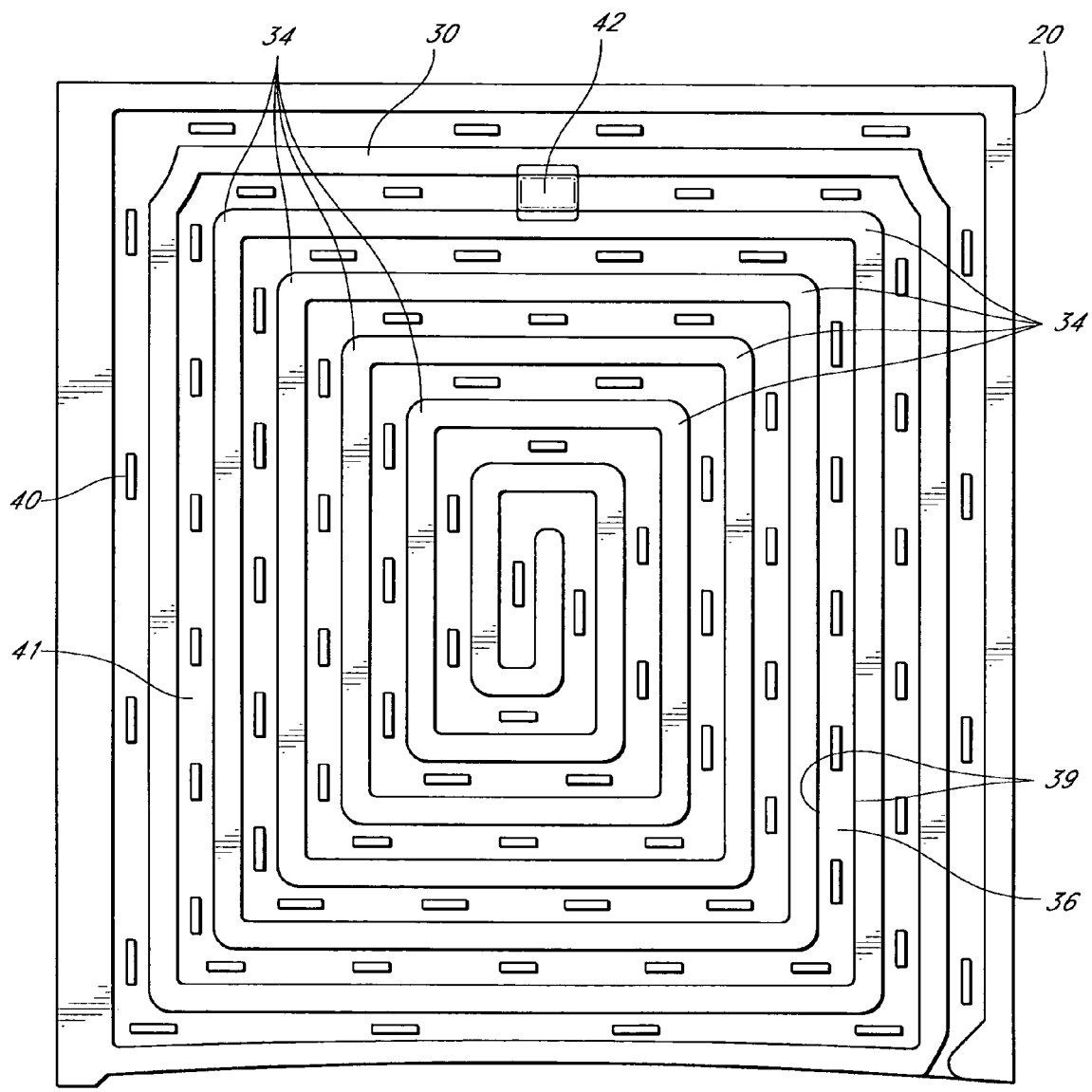
FIG. 3A is a bottom view illustrating a reinforcing layer for the tonneau cover of FIG. 1.
Figure 3B:
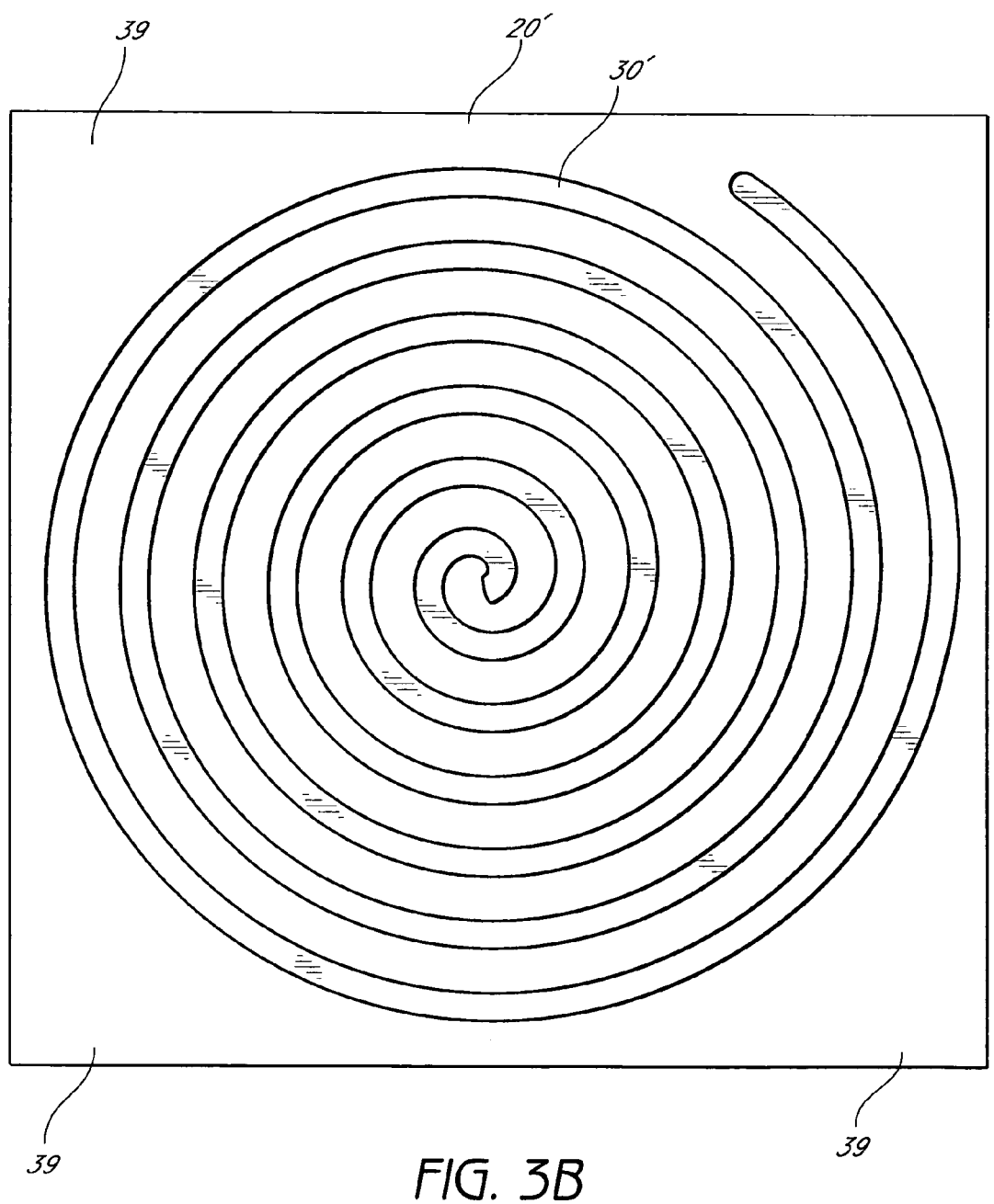
FIG. 3B is a bottom view illustrating a reinforcing layer for a tonneau cover according to other embodiments.

With reference to FIGS. 3A and 3B, some embodiments of a reinforcing layer 20, 20' for a tonneau cover 10 are illustrated. With reference to FIGS. 3A and 3B, the reinforcing layer 20, 20' includes a reinforcing beam 30, 30'. The region between the reinforcing beam 30, 30' is a recess 41. In some embodiments, only one continuous recess 41 is provided between different portions of one continuous beam 30, 30'. In the illustrated embodiments, reinforcing beam 30, 30' desirably follows a spiral-like continuous path without gaps or breaks. Also, in some embodiments, the reinforcing beam 30, 30' desirably is curvilinear and/or has rounded corners 34 rather than substantially squared corners. It is contemplated that squared corners could lead to stress concentrations in an overlying upper layer. These stress concentrations could lead to crazing, cracking, or other premature failures of the upper layer of a tonneau cover. In some embodiments, the reinforcing beam 30, 30' is an elongate beam, having a length that is at least greater than a sum of a length and a width of the reinforcing layer 20, 20'. In other embodiments, the reinforcing beam 30, 30' is an elongate beam having a length that is greater than a sum of the length and two times the width of the reinforcing layer 20, 20'. In other embodiments, the reinforcing beam 30, 30' is an elongate beam having a length that is greater than the full perimeter of the reinforcing layer 20, 20'. In the illustrated embodiments, the supporting structure or reinforcing beam 30, 30' does not intersect with itself. Although intersections of certain segments of the reinforcing beam 30, 30' with other segments of the reinforcing beam 30, 30' could provide a relatively stiff frame structure in some configurations, such intersections could lead to stress concentrations in the tonneau cover.

In the illustrated embodiments, the reinforcing beam 30, 30' has a generally square cross-section with a raised portion 36 transverse to, and generally perpendicular to two generally parallel side walls 38. In some embodiments, the opposite side of the recess 41 is a raised portion 36 that provides a relatively large surface that can be joined with a lower surface of the upper layer 24 such as by bonding with adhesive or other techniques, as described below with respect to FIG. 4.

In some embodiments, the raised portion 36 of the reinforcing beam 30 has a width of approximately 3 inches, and the side walls are likewise approximately 3 inches tall, creating a generally square reinforcing beam 30, the square defined by the raised portion 36, the two side walls 38, and an open side opposite the raised portion 36. However, it is contemplated that in other embodiments, the reinforcing beam 30 can have a generally square profile with a side length less than or greater than 3 inches. Further, it is contemplated that in other embodiments, the reinforcing beam 30 can have other profiles, such as a generally arched shape, a generally trapezoidal shape, or a generally triangular shape.

In some embodiments, at least one reinforcing rib 40 is provided to further stiffen the reinforcing layer 20, 20'. These ribs 40 provide additional resistance to bending and/or torsional forces without significantly affecting the overall weight of the tonneau cover 10. In some embodiments, these ribs 40 are positioned within the one or more recesses 41. Some of the ribs 40 can also be oriented in different directions (e.g., some of the ribs 40 can also be oriented orthogonal to others) to increase strength along different planes. In some embodiments, the reinforcing ribs 40 have a height that is less than the height of the reinforcing beam 30, 30'. In some embodiments, the reinforcing ribs 40 have a length that is less than the length of the reinforcing beam 30, 30'.

In the embodiments illustrated in FIGS. 3A and 3B, the continuous, non-intersecting path of the reinforcing beam 30, 30' allows the reinforcing layer 20, 20', when bumped or jostled, as when on a moving vehicle, to effectively act as a coil spring. Thus, deformation of the reinforcing layer 20, 20' responsive to these bumps or jostling motions is distributed substantially evenly across the surface of the reinforcing layer, thereby reducing localized stress concentrations on an upper layer overlying the reinforcing layer. Moreover, the reinforcing layer tends to return to a non-deformed state when the bumping or jostling stops, such as when a vehicle is traveling on smooth pavement, thus returning the upper layer to a non-deformed state and reducing the risk of damage to the upper layer.

FIG. 3A illustrates a reinforcing beam 30 arranged in a generally spiral path having straight sides of progressively longer lengths traveling outward along the beam 30 from near a center of the reinforcing layer 20. In the illustrated embodiments, the spiral path provides a spacing of approximately 4.5 inches between adjacent parallel raised portions 36 of the reinforcing beam 30. However, it is contemplated that in other embodiments, the spacings can be less than or greater than 4.5 inches.

With reference to FIG. 3A, as discussed above, in the illustrated embodiments, each corner 34 is rounded to reduce the risk of stress concentrations in the upper layer 24 (FIG. 3). It is contemplated in other embodiments the reinforcing beam 30 could have square corners, although resistance to cracking of the upper layer 24 (FIG. 2) could be impaired. Likewise, it is contemplated that intersections of the reinforcing beam 30 with itself, such as are present in a truss structure or ladder frame structure, can lead to stress concentrations. Advantageously, the continuous, non-intersecting path followed by the reinforcing beam 30 in the illustrated embodiments reduces the risk of stress concentrations. However, it is contemplated that in other embodiments, such as tonneau covers having multiple slideably or hingedly connected tonneau cover panels, one or some of the panels can have squared corners or an intersecting beam while the other panels do not.

In some embodiments, a space for a light 42 is provided in the reinforcing layer 20, 20'. In the three layer embodiments, an opening can be provided in the lower layer 28. In some embodiments, the light is attached to the tonneau cover 10 in a tilted orientation (when the cover is horizontal) so that the light 42 is directed substantially vertically downward when the tonneau cover 10 is tilted upward in an open configuration as shown in FIG. 1. In some embodiments, the light can have adjustable tilting. The power for the light can be provided by local battery or the battery of the vehicle. The light can be turned on or off by push button dome cover or with other switching capabilities.

FIG. 3B illustrates other embodiments of reinforcing beam 30' having a profile that generally follows an Archimedean spiral following a generally circular path with an expanding radius as the beam 30' is followed away from the center of the reinforcing layer. As compared with the reinforcing beam 30 profile of FIG. 3A, the generally circular profile covers less of a surface of the reinforcing layer 20', than are covered by the spiral illustrated in FIG. 3A, leaving unreinforced areas 39 near corners of the reinforcing layer 20'. These unreinforced areas 39 tend to be largest in covers for vehicle beds with relatively large differences between width and length dimensions. Thus it can be desirable to use a reinforcing layer 20' having a generally circular spiral reinforcing beam 30' in a tonneau cover 10 for a vehicle bed having nearly equal length and width (or for a nearly square portion of a multi-sheet tonneau cover). While two reinforcing beam 30, 30' paths are described herein, it is contemplated that still other reinforcing beam paths can be used in other embodiments of reinforcing layer 20.

Figure 4:
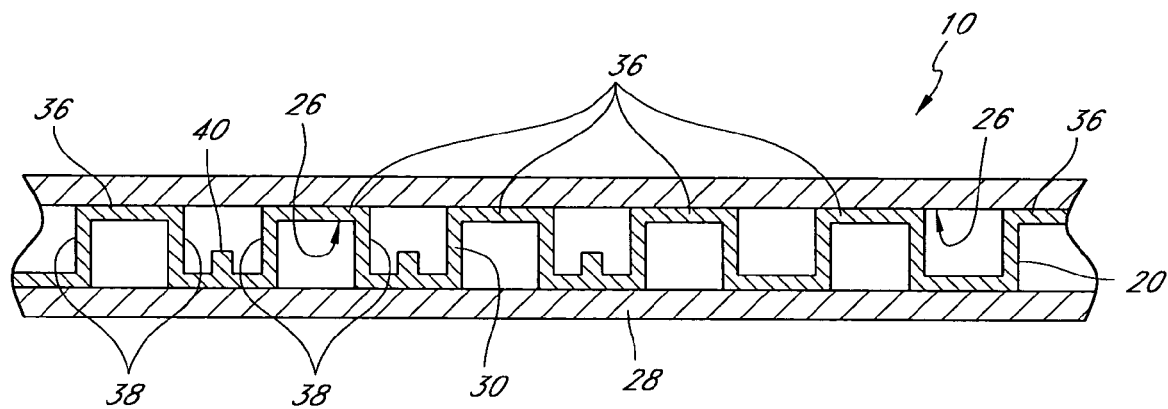
FIG. 4 is a cross-sectional view of the tonneau cover of FIG. 1 taken about line 4-4.

As illustrated in FIG. 4, in a tonneau cover 10 having a multilayer construction, the reinforcing layer 20 is disposed under the upper layer 24. The reinforcing layer can be sized to underlie substantially the entire upper layer 24. The reinforcing layer 20 can be coupled to the upper layer 24 using various techniques such as affixing with fasteners, bonding with adhesives, epoxies, solvents, or bonding through melting or welding of one or both of the layers. As illustrated in FIG. 4, a raised portion 36 of the reinforcing beam 30 is in contact with a lower surface 26 of the upper layer 24. Desirably, in some embodiments, this raised portion 36 of the beam 30 is affixed or bonded as described above to the upper layer 24 along substantially an entire length of the reinforcing beam 30 such as through the application of a bead of adhesive to the raised portion 36 of the beam 30 before joining with the lower surface 26. In other embodiments, the reinforcing layer 20 can be joined to the upper layer 24 by being affixed or bonded at fewer locations. In still other embodiments, a continuous reinforcing beam can be integrally formed with the upper layer such as by molding of a thermoplastic material.

Advantageously, in some embodiments the layered construction of upper layer 24 and reinforcing layer 20 substantially reduces stress concentrations on the upper layer 24 as relatively short spans of the upper layer 24 between adjacent raised portions 36 of the reinforcing beam 30 are unsupported. Moreover, the rounded corners 34 of the reinforcing beam 30 create reduced stress concentrations in the overlying upper layer 24 as compared with squared corners. The reinforcing layer 20 can be constructed of a relatively light weight material such as a molded or otherwise formed thermoplastic. Thus, the reinforcing layer 20 can increase the longevity of the tonneau cover 10 without significant increases in weight.

Additionally, the advantages offered by a layered tonneau cover 10 described with reference to various embodiments disclosed herein can be made available to many currently existing tonneau covers through retrofit. It is contemplated that a tonneau cover 10 incorporating a reinforcing layer 20, 20' can be pre-assembled for sale. Additionally, reinforcing layers 20, 20' can be sold separately to retrofit many currently existing tonneau covers.

As illustrated in the embodiments of FIGS. 2 and 4, further reinforcing can be provided in a tonneau cover 10 having a three-layer construction. A lower layer 28 can be affixed or bonded to the reinforcing layer 20, the upper layer 24, or both using one of the techniques described above. In the illustrated embodiments, non-raised portions 38 of the reinforcing layer 20 are adhered to the lower layer 28. As illustrated in cross-section in FIG. 4, the resulting structure appears as a generally corrugated reinforcing layer 20 sandwiched by two relatively planar layers 24, 28. In some embodiments, the lower layer 28 is constructed of the same material as the upper layer 24. In other embodiments, the lower layer 28 comprises a different material. In some embodiments, the lower layer 28 is substantially thinner than the upper layer 24. Thus, the additional weight of the tonneau cover 10 attributable to the addition of the lower layer 28 can be reduced. In other embodiments, the lower layer 28 can be substantially as thick as the upper layer 24.

In the embodiments illustrated in FIGS. 2 and 4, the upper layer 24 and the lower layer 28 create a sandwich construction. In some embodiments, additional layers can be added within this sandwich construction or outside. For example, one or more layers of thermally insulating material can be added between the upper layer 24 and the lower layer 28 or below the lower layer 28 to moderate temperature extremes that can occur in the vehicle bed when the vehicle is in hot or cold environments. One or more layers of sound-deadening material can be added between the upper layer 24 and the lower layer 28 or below the lower layer 28 to reduce road noise encountered in the vehicle's cabin.

Although these inventions have been disclosed in the context of certain preferred embodiments and examples, it will be understood by those skilled in the art that the inventions extend beyond the specifically disclosed embodiments to other alternative embodiments and/or uses of the invention and obvious modifications and equivalents thereof. Further, the various features of these inventions can be used alone, or in combination with other features of the inventions other than as expressly described above. Thus, it is intended that the scope of the inventions herein disclosed should not be limited by the particular disclosed embodiments described above, but should be determined only by a fair reading of the claims that follow.

The invention claimed is:

1. A cover for a vehicle bed, the cover comprising:
   a rigid upper layer configured to overlie at least a portion of the vehicle bed; and
   a reinforcing layer disposed under the upper layer, the reinforcing layer having a length and a width, and the reinforcing layer including a reinforcing beam configured to reduce stress concentrations on the upper layer, the reinforcing beam having a length that is greater than a sum of the length and the width of the reinforcing layer and the reinforcing beam not intersecting with itself.

2. The cover of claim 1, wherein the reinforcing beam follows a continuous path.

3. The cover of claim 2, wherein the continuous path comprises an expanding helical profile having generally linear sides and rounded corners.

4. The cover of claim 2, wherein the continuous path comprises an expanding helical profile comprising a spiral having an increasing radius.

5. The cover of claim 1, wherein the reinforcing beam comprises rounded corners.

6. The cover of claim 1, wherein the reinforcing layer comprises at least one recess between adjacent segments of reinforcing beam.

7. The cover of claim 6, wherein the reinforcing layer comprises one continuous recess between adjacent segments of reinforcing beam.

8. The cover of claim 6, wherein the reinforcing layer comprises at least one reinforcing rib positioned in the recess.

9. The cover of claim 8, wherein the reinforcing rib has a height that is less than a height of the reinforcing beam.

10. The cover of claim 8, wherein the reinforcing rib has a length that is less than a height of the reinforcing beam.

11. The cover of claim 1, further comprising a light retained by the reinforcing layer.

12. The cover of claim 1, wherein the rigid upper layer is adhered to the reinforcing layer.

13. The cover of claim 1, wherein the rigid upper layer is affixed to the reinforcing layer with fasteners.

14. The cover of claim 1, further comprising a lower layer disposed under the reinforcing layer.

15. The cover of claim 14, wherein the lower layer is adhered to one of the reinforcing layer and the upper layer.

16. The cover of claim 14, wherein the lower layer is affixed to one of the reinforcing layer and the upper layer with fasteners.

17. The cover of claim 1, wherein the rigid upper layer comprises a fiberglass material.

18. The cover of claim 1, wherein the rigid upper layer comprises a thermoplastic material.

19. A reinforcing layer for a tonneau cover configured to be disposed under the tonneau cover, the reinforcing layer has a length and a width, and the reinforcing layer includes a reinforcing beam to reduce stress concentrations on the tonneau cover, the reinforcing beam having a length that is greater than a sum of the length and the width of the reinforcing layer and the reinforcing beam not intersecting with itself.

20. The layer of claim 19, wherein the reinforcing beam follows a continuous path.

21. The layer of claim 20, wherein the continuous path comprises an expanding helical profile having generally linear sides and rounded corners.

22. The layer of claim 20, wherein the continuous path comprises an expanding helical profile comprising a spiral having an increasing radius.

23. The layer of claim 19, wherein the layer is comprised of a thermoplastic material.

* * * * *